US012775110B2

(12) United States Patent
Allmendinger et al.

(10) Patent No.: US 12,775,110 B2
(45) Date of Patent: Oct. 27, 2026

(54) SPECTRALLY RESOLVED X-RAY IMAGING

(71) Applicant: Siemens Healthineers AG, Forchheim (DE)

(72) Inventors: Thomas Allmendinger, Forchheim (DE); Markus Juergens, Adelsdorf (DE); Alexander Ziegler, Eggolsheim (DE); Patrick Wohlfahrt, Erlangen (DE)

(73) Assignee: Siemens Healthineers AG, Forchheim (DE)

(*) Notice: Subject to any disclaimer, the term of this patent is extended or adjusted under 35 U.S.C. 154(b) by 169 days.

(21) Appl. No.: 18/643,687

(22) Filed: Apr. 23, 2024

(65) Prior Publication Data

US 2024/0361480 A1 Oct. 31, 2024

(30) Foreign Application Priority Data

Apr. 25, 2023 (DE) .......................... 1020232037807

(51) Int. Cl.
*G01T 1/29* (2006.01)
*G01T 1/36* (2006.01)

(52) U.S. Cl.
CPC .......... *G01T 1/2992* (2013.01); *G01T 1/2985* (2013.01); *G01T 1/366* (2013.01)

(58) Field of Classification Search
CPC G01T 1/29; G01T 1/36; G01T 1/2985; G01T 1/2992; G01T 1/366; A61B 6/032; A61B 6/4035; A61B 6/405; A61B 6/4241; A61B 6/482; A61B 6/5205; A61B 6/5211; H04N 23/30
See application file for complete search history.

(56) References Cited

U.S. PATENT DOCUMENTS

| | | | | |
|---|---|---|---|---|
| 7,885,372 | B2 * | 2/2011 | Edic | G01N 23/046 378/19 |
| 9,861,324 | B2 * | 1/2018 | Wang | A61B 6/032 |
| 12,178,626 | B2 * | 12/2024 | Yeh | A61B 6/032 |
| 2008/0205585 | A1 | 8/2008 | Proksa et al. | |
| 2017/0172532 | A1 | 6/2017 | Flohr et al. | |

FOREIGN PATENT DOCUMENTS

DE 102015226489 A1 6/2017

OTHER PUBLICATIONS

Mccollough, Cynthia et al; "The technical development of photon-counting detector CT"; European radiology; published: Apr. 4, 2023; pp. 1-10.

* cited by examiner

*Primary Examiner* — Jurie Yun
(74) *Attorney, Agent, or Firm* — Harness, Dickey & Pierce, P.L.C.

(57) ABSTRACT

An X-ray system for acquiring projection measurement data of an examination object comprises: an X-ray emitter arrangement having an X-ray radiation source to emit X-rays; and a photon-counting X-ray detector with at least one detection threshold for spectrally resolved detection of the X-rays. The at least one detection threshold is variable spatially and/or temporally in a same measurement.

18 Claims, 2 Drawing Sheets

SPECTRALLY RESOLVED X-RAY IMAGING

CROSS-REFERENCE TO RELATED APPLICATION(S)

The present application claims priority under 35 U.S.C. § 119 to German Patent Application No. 10 2023 203 780.7, filed Apr. 25, 2023, the entire contents of which is incorporated herein by reference.

FIELD

One or more example embodiments of the present invention relate to an X-ray system for acquiring projection measurement data of an examination object. The X-ray system has an X-ray emitter arrangement having at least one X-ray radiation source for emitting X-rays. Furthermore, one or more example embodiments of the present invention relate to a method for image reconstruction via an X-ray system.

BACKGROUND

Modern imaging methods are often used to generate two-dimensional or three-dimensional image data that can be used to visualize an imaged examination object and also for other applications.

Imaging methods are often based on the detection of X-rays, wherein so-called projection measurement data is generated. For example, projection measurement data can be acquired with the aid of a computed tomography system (CT system). In the case of CT systems, a combination that is arranged on a gantry and comprises an X-ray radiation source and an X-ray detector arranged opposite it usually rotates around a measuring chamber in which the examination object (hereinafter referred to as the patient without limiting the generality of the term) is located. The center of rotation (also known as the "isocenter") coincides with a so-called system axis z. During one or more rotations, the patient is irradiated with X-rays from the X-ray radiation source, wherein projection measurement data is recorded with the aid of the opposing X-ray detector.

The projection measurement data generated depends in particular on the design of the X-ray detector. X-ray detectors usually have a plurality of detection units, which are usually arranged in the form of a regular pixel array. The detection units generate for each X-ray incident on the detection units a detection signal which is analyzed at specific points in time with regard to the intensity and spectral distribution of the X-rays in order to draw conclusions about the examination object and generate projection measurement data.

To date, X-ray detectors which, for acquiring measurement data over the entire energy range, integrate the so-called total spectrum, of the X-rays, have mostly been used to record the projection measurement data. In order to achieve a certain energy resolution, these can also be arranged in two layers as a "dual-layer X-ray detector", wherein the low-energy X-ray quanta are primarily detected in the first layer and the remaining higher-energy X-ray quanta in the second layer.

In order to acquire measurement data over the entire energy range in a CT system, solid-state X-ray detectors are generally used, which convert the incident X-ray quanta into visible light. The visible light is in turn converted into a digital measurement signal with the aid of photodiodes and suitable evaluation electronics. The incident X-ray quanta are not differentiated in terms of their energy and only an energy-integrated signal is measured.

There are basically two possible approaches for generating spectrally resolved image data: on the one hand, the emitted spectrum can be regulated via the X-ray radiation source, and on the other hand, the X-ray detector can be designed and, if necessary, regulated, for example using filters, so that it only detects defined areas of a relatively broad incoming spectrum. The spectral sensitivity distribution, which is given by the product of the spectrum and the sensitivity of the X-ray detector, is an indicator of the spectral separation.

In order to generate spectrally resolved CT images in combination with such a conventional X-ray detector, it is therefore necessary to change the X-ray spectrum at the X-ray radiation source in order to enable spectral material separation. The simplest technical solution for this is to perform two independent scans of the same object with different tube voltages.

A further variant is the "split filter", the pre-filter of which consists of two different materials that are permeable to different X-ray spectra. The X-rays are then only detected in the X-ray detector units or X-ray detector sections of an X-ray detector that are assigned to the corresponding pre-filter. In this variant, which is also characterized by the English word "twin beam", the spectrum is selectively changed at the X-ray radiation source by a selective material filter (for example tin and gold), so that one part of the X-ray detector measures a spectrum filtered by a first filter material, for example a "gold" spectrum, and a separate part of the X-ray detector detects a spectrum filtered by a second filter material, for example a "tin" spectrum. Alternatively, different filters can be introduced temporally offset into the beam path of the X-ray source.

In so-called "kV switching", the tube voltage, also known as the acceleration voltage, is varied in short time intervals over one or more readout cycles so that the electrons absorb different energies, which ultimately result as bremsstrahlung in different X-ray spectra. For example, the tube voltage is varied very quickly over one cycle of the CT system, i.e. between for example 80 kV and 140 kV every 0.5 ms with a rotation time of for example 0.5 seconds.

Spectrally resolved image data can also be obtained with the aid of dual-source systems, which use two X-ray tubes and two X-ray detectors to independently adjust the tube voltages and currents, also in combination with additional pre-filtering, in order in this manner to obtain X-rays with different spectra.

The methods described here for generating X-rays with different spectra, such as dual-source, kV switching and the use of filters, can also be combined with one other as desired.

In contrast, photon-counting X-ray detectors measure the input spectrum with spectral resolution. Depending on the number of detection thresholds or energy thresholds implemented, multiple spectrally different data sets are generated. However, the spectral separation of the individual data sets can be less good than with the previously described multi-energy approaches in which the spectrum of the emitted X-rays is varied, due to the fact that there is only one input spectrum. Counting CT X-ray detectors render it possible to individually detect the energy of each incident X-ray quantum. The X-ray detector signal generated in this manner usually consists of a count rate for each individual X-ray detector pixel per individual projection (~0.25 ms duration). This information is available in spectral resolution by returning it at the same time for multiple detection thresholds, for example 20 keV/40 keV/65 keV/80 keV. CT images from the data of the lowest threshold (for example 20 keV) thus correspond approximately to a classical CT X-ray detector at the same tube voltage with all X-ray quanta, while a CT image from an upper threshold (for example 65 keV) corresponds to a classical image at a higher tube voltage, since only the high-energy measured quanta contribute to the reconstruction. In this manner, a counting X-ray detector provides spectrally resolved information intrinsically, which enables spectral image reconstruction (iodine images, virtual non-contrast images, monoenergetic images, material parameter images).

Traditionally, the spectral separation that can be generated in this manner using a counting X-ray detector is a limiting factor. The spectral separation achieved is in a range comparable to two independent CT scans at 80 kV and 140 kV. Although this is sufficient for a large number of applications, it does not achieve the spectral separation of two different scans at, for example, 70 kV and 150 kV with additional tin filtering of the high spectrum, which can be achieved using a classic dual-source dual-energy system.

Furthermore, counting detectors with multiple detection thresholds generate very large amounts of data simultaneously, for the transmission of which sufficient data transmission capacity must be available. However, the data transmission capacity of the data path, in particular of a CT system, is limited by a "bottleneck", for example the slip ring, which forms the interface for data transmission between the rotating part of a CT system and the stationary part of a CT system. It is therefore necessary to keep the amount of projection measurement data generated by the X-ray detector as small as possible.

SUMMARY

It is an object of one or more embodiments of the present invention to provide an X-ray system and/or a method for acquiring projection measurement data on the basis of a counting X-ray detector and with improved spectral separation and/or reduced amount of data than previously achieved when using counting X-ray detectors.

At least this object is achieved by an X-ray system and/or a method for image reconstruction according to one or more embodiments of the present invention.

The X-ray system mentioned at the beginning, preferably a computed tomography system, comprises, in addition to the X-ray emitter arrangement already described at the beginning, a photon-counting X-ray detector having at least one detection threshold, which can be varied spatially and/or temporally in one and the same measurement, for spectrally resolved detection of the X-rays for acquiring projection measurement data of an examination object according to an embodiment of the present invention.

It should be expressly mentioned at this point that the indefinite article "a" or "an" does not imply any limitation with regard to the number of claimed objects, rather it also includes a plurality thereof. In particular, the X-ray system according to an embodiment of the present invention may also comprise a plurality of X-ray radiation sources and a plurality of X-ray detectors. However, an X-ray system having a single X-ray source and a single X-ray detector is preferably considered in the present patent application.

The term "X-ray system" is preferably understood to mean a computed tomography system, but it can also include a simple projection X-ray device, a C-arm X-ray device, an angiography device or other X-ray based imaging devices. In the following, therefore, without limiting the generality, reference is also made to a computed tomography system. The object to be examined may be an object or also an animal, but preferably a human patient.

The X-ray radiation source of the X-ray emitter arrangement comprises an X-ray tube and thus represents the beam-generating unit with which X-rays with a predetermined spectrum are emitted. This unit may also include other elements such as diaphragms, filters, shutters or the like. The term "spectrum" or X-ray spectrum corresponds to emitted radiation with a distribution of different energies or wavelengths, which is generated in an X-ray radiation source as bremsstrahlung. The spectrum is often characterized here by the voltage applied in the X-ray tube, for example 80 kV or 140 kV or similar.

The X-ray detector acquires projection measurement data from the examination object. This therefore indicates the intensity and energy distribution of the X-rays in a locally resolved manner, which are projected onto the X-ray detector as a defined spectrum from the X-ray radiation source in the main beam direction through the examination object. Depending on the thickness and material of the examination object, the X-rays can be absorbed and/or scattered locally differently by the examination object. As a result, the projection measurement data contains local information about the examination object in the logical inversion. The energy distribution of the X-rays arriving at the X-ray detector downstream of the examination object, i.e. the energy distribution of the projection, is measured via the detection thresholds of the spatial and energy-resolving X-ray detector. The measurement data, which is to be understood as projection measurement data, can therefore form a basis for generating image data of the examination object. The projection measurement data can be assigned to the spectrum emitted by the X-ray radiation source. The projection measurement data therefore includes information about the spectrum used on the source side, location information, information about the main beam direction and about the energy of the individual photons deposited in the X-ray detector.

The photon-counting X-ray detector in turn preferably comprises a sensor array of semiconductor sensors, for example made of silicon (Si), cadmium telluride (CdTe) or cadmium zinc telluride (CZT) as X-ray detector units or X-ray detector pixels, which convert the incident photons directly into an electrical signal.

Photon-counting X-ray detectors, also known as quantum-counting X-ray detectors, usually have an arrangement of multiple detector elements (pixels) made of a directly converting semiconductor material. Incident X-ray photons or X-ray quanta generate an electrical signal in the semiconductor material. A detected radiation quantum generates a charge pulse in the respective detector element of an exemplary photon-counting detector, which is converted by the detector electronics into a measurement voltage that is compared with threshold voltages representing different energy levels in one or more comparators of the exemplary photon-counting detector. In this manner, a specific energy can be assigned to a detected photon and the photon counted accordingly.

Since the size of the charge pulse or the measurement voltage generated from it depends on the energy of the incident X-ray quantum, a spectral selection of the counted radiation quanta can be achieved by setting the electrical threshold height or the threshold value of the comparator. Only those radiation quanta are counted which, due to their energy, generate an electrical signal that exceeds the threshold value of the comparator. This represents a detection threshold, wherein only signals from the X-ray quanta whose energy is above the detection threshold are detected.

One or also more detection thresholds, in particular multiple adjustable detection thresholds, can be provided in the exemplary photon-counting X-ray detector. This enables the detection of X-ray quanta in multiple energy ranges (also referred to as “energy window” or “energy bin” or “bin”), which are defined or adjustable by the detection thresholds.

The photons are therefore preferably detected locally via the sensor field, i.e. captured in a locally resolved manner, and at the same time sorted into so-called bins depending on their energy, i.e. captured in an energy-resolved manner. The semiconductor sensors can therefore capture the light quanta separately for at least two different energy ranges. Detection thresholds can be defined as required for this sorting and set electronically via a control device. This allows the individual X-ray detector units to be adapted to the requirements of the examination. The electrical signals, the totality of which represents the projection measurement data, are then forwarded to an evaluation unit. This can be included in the control device and implemented in a computing unit, for example.

In the simplest case, the photon-counting X-ray detector only has a single detection threshold that varies temporally or spatially. The detection threshold specifies a threshold value or minimum value of an energy of an X-ray quantum that is required in order to be able to detect the X-ray quantum using a counting X-ray detector or a sensor unit of the X-ray detector. Due to the spatial and/or temporal variation of the detection threshold, it is now possible to reduce the number of detection thresholds per pixel, ideally to a single detection threshold, and still obtain spectrally differentiated or resolved projection measurement data from an examination object due to the variation of the energy value of this individual detection threshold, be it spatially and/or temporally. In the case of a spatial variation of the detection thresholds, different areas of one and the same X-ray detector, in particular different sensor pixels, are therefore activated in such a manner that they have different detector thresholds with different energy ranges at one and the same time. In the case of a temporal variation of the detector thresholds, on the other hand, the detector thresholds of an X-ray detector change depending on the time during one and the same measurement. Preferably, the temporal variation takes place alternately at short time intervals, in particular at time intervals which comprise the rotation time of the X-ray emitter-X-ray detector system or a multiple thereof. The difference with respect to already known X-ray systems having photon-counting X-ray detectors is therefore the special activation of the X-ray detector during one and the same measurement. Projection measurement data with different detection thresholds are recorded in different temporal sections or different detector areas.

“One and the same measurement” refers to a single acquisition or image capture, which is also typically referred to as a “scan”. “One and the same measurement” therefore refers to a set of individual projections consisting of the respective detector measurement values (typically several thousand projections), which represent a complete acquisition and from which a complete image volume is calculated at the end. The typical acquisition time of such a single scan is between 1 and 30 seconds.

This flexible type of activation can now be used advantageously to reduce the number of detection thresholds required simultaneously per pixel, since the threshold values of the detection thresholds are adapted to the respective incident specific spectrum or the X-rays incident with the respective specific spectrum. By reducing the number of detection thresholds, the necessary data rate for transmitting the projection measurement data from the X-ray detector, for example via a slip ring, to a stationary control device is advantageously reduced.

If the X-ray detector has a plurality of different detection thresholds per X-ray pixel, the spatially and/or temporally spectrally variable X-rays can be separated more precisely than is possible in the case of an X-ray system with spatially and temporally invariable threshold values for one and the same measurement or only one variable detection threshold per X-ray detector unit. For example, two detection thresholds can be selected in such a manner that the X-ray detector or X-ray detector pixel acquires projection measurement data with low energy above the first detection threshold and below the second detection threshold and separately therefrom acquires projection measurement data with particularly high energy above the second detection threshold, whereby the spectral separation of the irradiated X-ray spectrum is improved and thus also the image quality of possible image data constructed on the basis of the spectral projection measurement data. It should be noted that the second detection threshold cannot also be set arbitrarily high because the number of X-ray quanta detected above the second detection threshold then decreases so much that the statistical error becomes too large for a reliable measurement. If necessary, the value for the individual detection thresholds can be optimally determined by a simulation program, for example depending on the examination object and the X-ray spectrum of the irradiated X-rays, and thus the image quality of image data of a subsequent image reconstruction can be optimized. In order to implement the X-ray system according to an embodiment of the present invention, in particular the firmware for determining and selecting the thresholds of different X-ray detector sub-areas, in particular different X-ray detector pixels, can be modified accordingly in order to enable a temporally or spatially individually different selection of the threshold values of their detection thresholds.

The above-mentioned method for image reconstruction via an X-ray system comprises the following steps:

In a first step, X-rays are generated and emitted by an X-ray emitter arrangement having an X-ray radiation source.

In a second step, energy-resolved detection of at least the X-rays passing through the examination object is carried out as projection measurement data by a photon-counting X-ray detector with at least one spatially and/or temporally variable detection threshold for spectrally resolved detection of the X-rays.

In a third step, an image is reconstructed on the basis of the projection measurement data of the examination object.

An X-ray system according to an embodiment of the present invention is preferably used to perform the method. The X-ray system can be automatically controlled via a control device, for example with the aid of a defined examination protocol, and/or settings for the individual parameters required for the examination can be performed by an operator via an input interface.

In particular, the X-ray spectra used as well as the detection thresholds can be set to be spatially variable during one and the same measurement or can be temporally varied during the measurement. After acquisition, the projection measurement data can be transmitted directly to an evaluation unit and/or to an intermediate memory in which the projection measurement data is stored as projection measurement data. The image reconstruction step can therefore take place immediately or at a later point in time, depending on requirements. In the course of reconstruction, an image of the examination object is generated on the basis of the projection measurement data of the examination object using, if necessary, known image generation methods modified accordingly for a finer spectral separation.

This can be an image of the examination object, for example in the form of sectional images, 3D images or even 4D image data (with a temporal component). The image can be displayed in greyscale or also highlighted in color according to a material or tissue composition, wherein the composition is determined on the basis of the projection measurement data. This is particularly advantageous for the detection of calcifications of blood vessels, contrasted objects and/or tumors.

Methods according to embodiments of the present invention for image reconstruction via an X-ray system shares the advantages of X-ray systems according to embodiments of the present invention.

A majority of the aforementioned components of the X-ray system can be realized in whole or in part in the form of software modules in a processor of a corresponding computing system, for example of a control device of an X-ray system. A largely software-based realization has the advantage that previously used computing systems, in particular control devices, can also be retrofitted in a simple manner by a software update in order to work in the manner according to an embodiment of the present invention. In this respect, the object is also achieved by a corresponding computer program product having a computer program which can be loaded directly into a memory device of a control device of an X-ray system, with program sections in order to perform all steps of the method according to an embodiment of the present invention when the program is executed in the control device. In addition to the computer program, such a computer program product may comprise additional components such as for example documentation and/or additional components, including hardware components such as hardware keys (dongles, etc.) for using the software.

A computer-readable medium, for example a memory stick, a hard disk or any transportable or permanently installed data carrier, on which the program sections of the computer program that can be read in and executed by a computing unit of the control device are stored, can be used for transport to the control device and/or for storage on or in the control device. The computing unit can, for example, have one or more co-operating microprocessors or the like for this purpose.

Further, particularly advantageous embodiments and developments of the present invention are apparent from the dependent claims and the description below, wherein the independent claims of one claim category can also be developed analogously to the dependent claims of another claim category and, in particular, individual features of different exemplary embodiments or variants can also be combined to form new exemplary embodiments or variants.

In the case of one variant of the X-ray system according to an embodiment of the present invention, the photon-counting X-ray detector has at least two spatially and/or temporally variable detection thresholds for spectrally resolved detection of the X-rays. In the case of this variant, the X-ray spectrum can be segmented, which improves the spectral separation.

In the case of a preferred exemplary embodiment of the X-ray system according to an embodiment of the present invention, the photon-counting X-ray detector has at least four, preferably at least six, detection thresholds. In the case of a higher number of detection thresholds, the X-ray spectrum can be further segmented, which additionally improves the spectral separation. For this purpose, however, the maximum data transmission rate must be increased accordingly compared to a variant with only one or two detection thresholds.

In a particularly preferred variant of the X-ray system according to an embodiment of the present invention, the X-ray emitter arrangement is designed to generate X-rays with at least two spectra, which means that either a single X-ray radiation source can generate at least two, preferably different, spectra, or multiple X-ray radiation sources preferably different spectra. Thus, even in the case of multiple X-ray radiation sources, each individual X-ray radiation source can be designed to generate different spectra.

Advantageously, the X-ray system according to embodiments of the present invention thus combines the known multi-energy technologies with a photon-counting X-ray detector and not with energy-integrating X-ray detectors, wherein the detection thresholds of the entire X-ray detector or individual X-ray detector fields or X-ray detector units of the photon-counting X-ray detector are designed to be temporally or spatially variable.

Preferably, the photon-counting X-ray detector is configured so that the detection thresholds of the X-ray detector are adapted to a temporal or spatial variation of the X-ray spectrum occurring during one and the same measurement. As a result, a better spectral separation, i.e. a finer segmentation of the X-ray spectrum detected for imaging, can be achieved, since the spectrum is subdivided both on the source side during emission and also on the X-ray detector side during detection in a coordinated, area-dependent or time-dependent manner. This ultimately results in improved imaging.

In order to generate different spectra, the X-ray radiation source of the X-ray system according to an embodiment of the present invention preferably comprises at least one pre-filter for dividing the X-ray beam into at least two spatially separated X-ray beam sections with a different X-ray spectrum. The pre-filter can, for example, be designed as a plate made of light or heavy metal in order to absorb the soft and medium-soft rays. A pre-filter of this form therefore essentially hardens the beam, as it primarily filters out the X-rays with less penetrating, longer wavelengths. It is therefore possible to generate two different X-ray spectra using just one pre-filter, namely the spectrum actually generated by the X-ray tube and the spectrum modified by the pre-filter. Two possible applications of this effect are described in the following sub-variants. Such a filter is also known as a split filter, since it splits the X-ray beam into two spatially separated split-beams with different X-ray spectra. An X-ray beam generated by the split filter is referred to as a "twin beam".

In a special variant, the at least one pre-filter of the X-ray system according to an embodiment of the present invention is preferably configured so as to spatially distribute regions of an X-ray spectrum to defined angular regions of the photon-counting X-ray detector. In the case of this variant, the detection thresholds of the photon-counting X-ray detector have different values in different angular ranges depending on the ranges of the X-ray spectrum in order to be able to spectrally resolve the split-beams with different spectra in a particularly precise manner.

For this purpose, the pre-filter has filter areas preferably made of different materials that are permeable to different spectra. The radiation emitted by this split filter is accordingly emitted via the filter areas at certain angular ranges, so that it ultimately also hits dedicated areas of the sensor field of the X-ray detector, which are assigned to the respective spectrum by their arrangement. If, for example, an arrangement of X-ray radiation source and X-ray detector is rotated on a circular path around the examination object and all filter areas are on the circular path, complete projection measurement data of the examination object is recorded for all spectra generated by the pre-filter. If the filter areas are arranged orthogonally to the circular path, i.e. in the direction of the axis of rotation, the projection measurement data can, for example, be captured in different orbits if the respective area of the examination object is swept multiple times with axial displacement during a spiral scan corresponding to the filter areas. The pre-filter preferably comprises two filter areas.

The at least one pre-filter preferably has a first filter section with a first filter material and a second filter section with a second filter material that differs from the first filter material in order to divide the X-ray spectrum. Advantageously, different spectral components are absorbed by filter sections with different filter materials, so that the already mentioned spatially divided split-beams with different spectra are produced.

Particularly preferably, the first filter material of the pre-filter of the X-ray system according to an embodiment of the present invention has gold and the second filter material has tin. Advantageously, the gold filter generates X-rays with a low-energy X-ray spectrum and the tin filter generates X-rays with a high-energy X-ray spectrum.

In one variant of the X-ray system according to an embodiment of the present invention, the at least one pre-filter is configured so as to temporally modify the X-ray spectrum, which is detected in a synchronized manner by the photon-counting X-ray detector.

In this second sub-variant of the X-ray system according to an embodiment of the present invention, the at least one pre-filter temporally modifies the X-ray spectrum, which is detected in a synchronized manner by the photon-counting X-ray detector. As a result, the spectrum is varied temporally. This can be achieved, for example, by periodically and rapidly inserting and removing the pre-filter into and out of the beam path. Alternatively, it is also possible to switch between different pre-filters. In this variant, the switching of the detection thresholds of the X-ray detector is synchronized with the switching between the different X-ray spectra.

In principle, the two sub-variants described above can also be combined with each other. For example, in principle suitable pre-filters arranged in series can be used to generate spectra that are simultaneously separated spatially and modified temporally in order to achieve an even finer energetic segmentation of the spectra.

In a very practicable variant of the X-ray system according to embodiments of the present invention, the X-ray radiation source is designed in such a manner that it switches between different acceleration voltages under the control of a control device. In addition, the photon-counting X-ray detector is configured to detect the X-rays in synchronization with the activation of the X-ray radiation source. In this variant, the selection of the detection thresholds of the X-ray detector is synchronized with the respective X-ray spectrum emitted at that time.

The X-rays are therefore detected by the photon-counting X-ray detector in synchronization with the change in acceleration voltages, in each case with one or more detection thresholds that are particularly suitable for the specific X-ray spectrum. In the case of this variant, known as kV switching, the spectrum of the emitted X-rays can therefore be modified as soon as they are generated simply by controlling the tube voltage. Preferably, the tube voltage alternates at a high frequency, for example 500 or 1000 Hz, between two fixed values, for example 80 kV and 140 kV. For synchronization of the detection and for comparison with the originally emitted spectra, the data recorded from areas in which the X-rays do not pass through the examination object can be used advantageously. This data essentially reproduces the exact spectrum emitted by the X-ray radiation source, i.e. apart from the influence of the ambient air.

In the case of the above-described variant of the X-ray system according to an embodiment of the present invention with "kV switching", the photon-counting X-ray detector is thus preferably configured so as to switch back and forth between at least two adapted sets of counting thresholds or detection thresholds in synchronization with the switching of the X-ray radiation source, controlled by the control device of the X-ray system. Advantageously, the counting thresholds are adapted to the incident X-ray spectrum, which improves the resolution of the different X-ray spectra emitted at a different time.

Particularly preferably, the photon-counting X-ray detector of the X-ray system according to an embodiment of the present invention is configured so as to read out and transmit only a portion of the counting thresholds at a time, synchronized with the switching of the X-ray radiation source and controlled by the control device. Advantageously, a spectral resolution can be achieved despite a technical limitation of the data transmission rate for the transmission of data between the rotating X-ray detector to a stationary evaluation unit via a slip ring. In phases of high voltage, for example at 140 kV, only a higher detection threshold, for example 55 keV, is read out and transmitted to the evaluation unit, while at low voltage, for example 80 kV, only a low detection threshold, for example 20 keV, is read out and transmitted to the evaluation unit.

A further variant of the X-ray system according to an embodiment of the present invention comprises a control device which is designed so as to control an X-ray radiation source and the photon-counting X-ray detector in such a manner that projection measurement data with different X-ray spectra are acquired in at least two different scans. The different X-ray spectra are generated by different acceleration voltages of the X-ray radiation source. In the case of this "double spiral" variant, the X-ray spectrum of an X-ray tube is varied via the tube voltage in a similar manner to kV switching. Unlike kV switching, however, the voltage is not changed at a high frequency, but remains constant for one scan procedure, for example 80 kV, and is regulated to another constant value, for example 140 kV, for the at least one sequential scan. In the case of this variant, the detection thresholds are also adjusted in synchronization with the change in tube voltage. Such a variation of the tube voltage between different scans can be combined, for example, with a slow temporal variation of the detection thresholds and a spatial variation of the detection thresholds.

In the case of a further variant of the X-ray system according to an embodiment of the present invention, the X-ray emitter arrangement has at least two X-ray radiation sources that are designed so as to generate different X-ray spectra. The different spectra of the at least two X-ray radiation sources can be generated by different acceleration voltages and/or different filters. It is true that only one large X-ray detector having detection areas which are assigned to the individual X-ray radiation sources can be designed for the at least two X-ray radiation sources. Preferably, however, each X-ray radiation source is assigned its own X-ray detector. Particularly preferably, the X-ray system has precisely two X-ray radiation sources, preferably arranged approximately orthogonally to each other, each with an associated X-ray detector. This variant advantageously allows completely separate X-ray spectra to be generated and these to be detected using separate X-ray detectors. In this case, detection thresholds are also varied temporally or spatially on the detector side in order, if necessary, to improve the detection of the different spectra or, if necessary, to reduce the data transmission rate when transmitting projection measurement data between the X-ray detector and an evaluation unit.

In a preferred embodiment of a method according to the present invention for image reconstruction, the projection measurement data is assigned to the respective X-ray spectrum. This means that based on the energy values themselves and/or the spatial separation and/or temporal synchronization, the spectrum emitted by the X-ray radiation source can be linked to the values captured by the X-ray detector in the projection measurement data. The projection measurement data can therefore be used to determine which emitted spectrum was used to generate the detected energy values or intensity values.

In the case of the reconstruction of the image according to an embodiment of the present invention, the projection measurement data that is assigned to the different X-ray spectra is preferably combined to form an optimized image. The image can be optimized on the basis of various criteria. For example, certain areas can be selected from the projection measurement data of the examination object, in which, for example, blood vessels, bones or organs are located, which are optimally displayed using projection measurement data from a certain spectral range. However, optimization can also be carried out with regard to parameters such as contrast, noise or similar.

In one embodiment of the X-ray system according to the present invention, the X-ray system comprises a control device which is designed so as to control an X-ray radiation source and the photon-counting X-ray detector in such a manner that at least two sets of projection measurement data with different X-ray spectra are acquired. Preferably, the photon-counting X-ray detector of the X-ray system according to an embodiment of the present invention has at least one first sub-area with at least one first detection threshold and a second sub-area, arranged spatially alternating with the first sub-area, with at least one second detection threshold, the threshold value of which differs from a threshold value of the first detection threshold.

In the case of this variant, spectral images can be generated even though only one detection threshold is available in the respective sub-areas. This variant is particularly favored for so-called spectral UHR imaging ("UHR" stands for "ultra high resolution"). Here a checkerboard-like arrangement of X-ray detector fields or X-ray detector pixels is formed, wherein fields directly neighboring the respective edges of a field have different detection thresholds or threshold values and diagonally neighboring fields have the same detection thresholds or threshold values. In order to obtain data for the respective gaps in the spectral image data for an ultra-high resolution image display, an interpolation is carried out based on the projection measurement data of the adjoining fields of the same spectrum, wherein the maximum accessible sharpness of the image data obtained based on the projection measurement data is reduced compared to image data based on projection measurement data of all fields of the X-ray detector. However, the sampling is uniform over the course of the entire data acquisition without a significant spatial or temporal offset and the potential artifacts resulting therefrom.

It is particularly preferable for the first sub-area and the second sub-area to form a checkerboard-like pattern. Advantageously, missing measured values from fields located between two fields with the same detection threshold can be interpolated easily and precisely. This interpolation can be carried out "three-dimensionally", since in addition to the neighbors in the row direction and channel direction, a temporal neighbor is also available in the next projection with the target spectrum, since the detector pixel has then switched over. This means that each pixel to be interpolated has a total of 6 neighbors at any time (2×channel+2×row+2×neighboring projection).

If, instead of the spectral image data, a high resolution of a mixed image with maximum sharpness is preferred, it is preferable that the first sub-area and second sub-area are configured so as to swap their detection thresholds or threshold values after each projection. In the case of this variant, projection measurement data with a maximum resolution is obtained for both spectra. Since only a single image is produced, the spectral information is completely ignored and a mixed image containing the full original resolution without the effects of interpolation is simply calculated on the basis of the measured attenuation.

The variants described above, in which alternately arranged sub-areas of an X-ray detector are subjected to different threshold voltages, can also be combined with the above variants, in which the X-rays are divided into at least two spatially separated X-ray sections with a different X-ray spectrum ("split filter").

In the case of so-called threshold mixing (mixing counting values of multiple detection thresholds), sensor data from multiple detection thresholds is combined. For example, there is a conventional method in which four thresholds E1, . . . E4 are recorded at the X-ray detector, but then combined into two new thresholds before transmission, i.e. E1*=2*E1+E2 and E2*=E3+E4 are transmitted. No spatial or temporal variation is generated with this conventional threshold mixing.

In the case of a combination of the UHR-Scan and twin beam variants described above, i.e. a preferably checkerboard-like division of the sensor field and a spatial and spectral division of the X-ray beam, it is possible that the basic arrangement of the "checkerboard" of the UHR scan remains, but first and second thresholds E1 and E2 are used on the side covered by a first filter, in particular gold, and third and fourth thresholds E3 and E4 that are different therefrom are used on the side covered by a second filter, in particular tin, which thresholds in each case generate this checkerboard arrangement and at the same time produce an improved spectral separation due to the difference between E1, E2 and E3, E4.

A combination of the variants in which the X-rays are divided into at least two spatially separated X-ray sections with a different X-ray spectrum ("split filter") and the variants in which the X-ray source switches between different acceleration voltages (kV switching) can also be realized. Here too, particularly good spectral separation can be achieved by a suitable selection of the different spectra of the emitted X-rays and an appropriate choice of filters.

BRIEF DESCRIPTION OF THE DRAWINGS

The present invention is explained in more detail below with reference to the attached figures using exemplary embodiments. In the various figures, identical components are provided with identical reference characters. The figures are generally not to scale. In the drawing.

DETAILED DESCRIPTION

Figure 1:
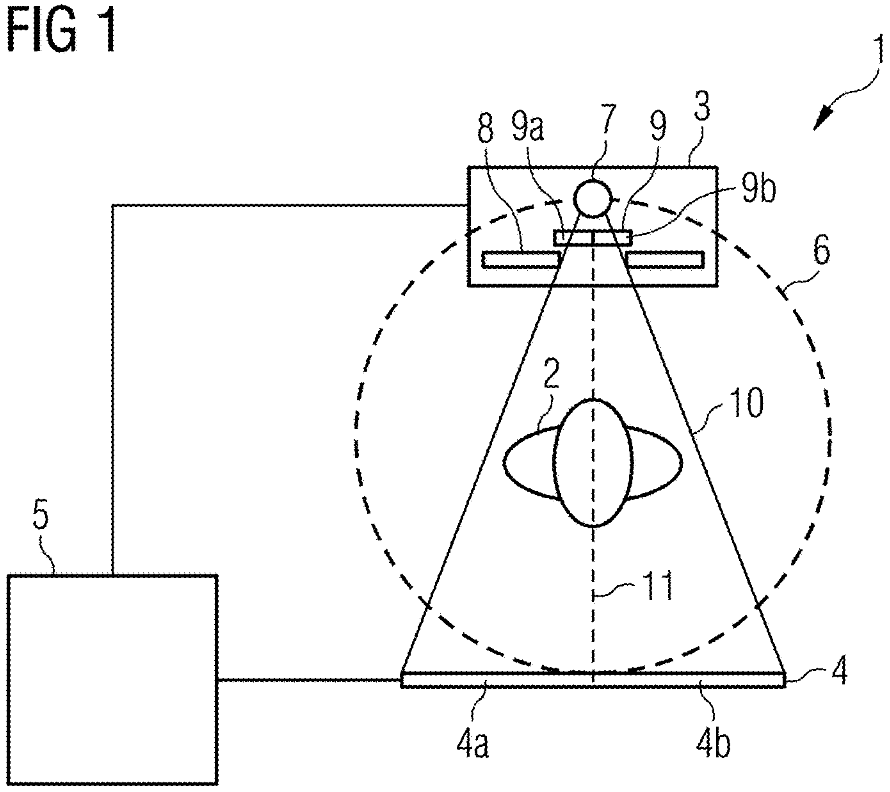
FIG. 1 shows a schematic representation of an X-ray system with a split filter according to an exemplary embodiment of the present invention.

FIG. 1 shows a computed tomography system 1 according to an exemplary embodiment of the present invention with a split filter 9.

The use of a split filter 9 enables the acquisition of spectrally resolved images using only one X-ray radiation source 3. The split filter 9 is divided in such a manner that it divides the X-ray beam fan of the X-ray beam of the X-ray radiation source 3 in the row direction.

Since a computed tomography system 1 represents the preferred embodiment of the X-ray system according to the present invention, the following explanations refer to a computed tomography system 1 without limiting the generality. The computed tomography system 1 here comprises an X-ray emitter arrangement having an X-ray radiation source 3, an X-ray detector 4 and a control device 5. The X-ray radiation source 3 and the X-ray detector 4 are connected to the control device 5. The X-ray radiation source 3 and the X-ray detector 4 are movable and arranged diametrically to each other on a circular path 6. They are therefore in a fixed positional relationship to each other, in which the X-ray detector 4 detects the radiation emitted by the X-ray radiation source 3, and thus form a first source-X-ray detector arrangement. A patient 2 is located in the center of the circular path 6 as the examination object. The X-ray radiation source 3 comprises an X-ray tube 7 and an aperture 8. The aperture 8 is arranged at a slight distance from the X-ray tube 7 on a side of the X-ray tube 7 facing the patient 2. It can be used to adjust an exit angle of the X-rays 10 emitted by the X-ray tube 7 during operation.

A pre-filter in the form of a split filter 9 is inserted between the X-ray tube 7 and the aperture 8. The pre-filter has two filter sections 9*a*, 9*b* with materials with different properties in terms of their X-ray absorption, for example gold and tin. A first filter section 9*a*, which is shown on the left-hand side in FIG. 1, has gold as the filter material in this specific exemplary embodiment and a second filter section 9*b*, which is shown on the right-hand side in FIG. 1, has tin as the filter material. The X-rays generated by the X-ray tube 7 are thus pre-filtered differently depending on the material and emerge from the X-ray radiation source 3 in the form of two different X-ray spectra. These are spatially separated along a dividing line 11 corresponding to the boundary between the materials of the split filter 9 into a low-energy and a high-energy spectrum. In addition, the X-rays 10 of the two spectra projected onto the X-ray detector 4 by the patient 2 are also spatially separated in different areas of the X-ray detector 4 and can thus be assigned to the respective emitted spectrum. The X-ray detector 4 has two different sub-areas 4*a*, 4*b* for this purpose, wherein the first sub-area 4*a* (shown on the left-hand side in FIG. 1) has detector fields with detection thresholds that are adapted to the detection of low-energy X-rays, and the second sub-area 4*b* (shown on the right in FIG. 1) has detector fields with detection thresholds that are adapted to the detection of high-energy X-rays. Alternatively, the split filter 9 can also be arranged rotated by 90° so that the dividing line 11 divides the different spectra virtually in the image plane. In the case of this alternative, the projection measurement data for both spectra for the areas of patient 2 to be imaged are acquired sequentially using the table feed. In the case of this alternative, the detector is also divided into different sub-areas 4*a*, 4*b* by a dividing line lying in the image plane.

During operation, the X-ray radiation source 3 and the X-ray detector 4 are rotated around the patient 2 on the circular path 6 to acquire projection measurement data. The acquired projection measurement data can then be transmitted to an evaluation unit located, for example, in the control device 5 and reconstructed there to form an image B of the patient 2 (see also step 4. III in FIG. 4). In order to acquire projection measurement data from other areas of the patient 2, the patient 2 can be moved relative to the computed tomography system 1, for example via a positionable patient table (not shown here), perpendicular to the plane of the circular path 6. In the case of so-called spiral CT, the acquisition is continuous with a likewise continuous table feed.

In the case of an X-ray detector 4 having 64 X-ray detector rows, rows 1 to 32 acquire the X-ray spectrum which has been filtered using the gold filter 9*a*, and rows 33 to 64 acquire the X-ray spectrum which has been filtered using the tin filter 9*b*. The acquisition of projection measurement data is preferably carried out in a spiral mode with a low pitch of, for example, 0.4, which enables independent image reconstruction in two volumes based on projection measurement data of the first 32 rows and the last 32 rows separately, wherein spectrally resolved images are generated. The detection thresholds of the individual sub-areas 4*a*, 4*b* of the X-ray detector 4, which are assigned to X-rays with different X-ray spectra, are adapted to the different X-ray spectra in the case of the arrangement shown in FIG. 1. For example, at a fixed tube voltage of 140 keV, detection thresholds of 20 keV and 35 keV are set up for the first 32 rows of the X-ray detector 4, i.e. the first sub-area 4*a* of the X-ray detector 4, which detects the low-energy X-rays that have been transmitted through the gold filter 9*a*, and correspondingly higher detection thresholds of 25 keV and 60 keV are set up for the last 32 rows of the X-ray detector 4, i.e. the second sub-area 4*b* of the X-ray detector 4, which detects the high-energy X-rays that have been transmitted through the tin filter 9*b*. Alternatively, the required data rate can also be halved by providing only a single detection threshold for each sub-area 4*a*, 4*b* of the X-ray detector 4. In this variant, a detection threshold of 20 keV would be used for the first 32 rows and a detection threshold of 50 keV would be used for the second 32 rows.

Figure 2:
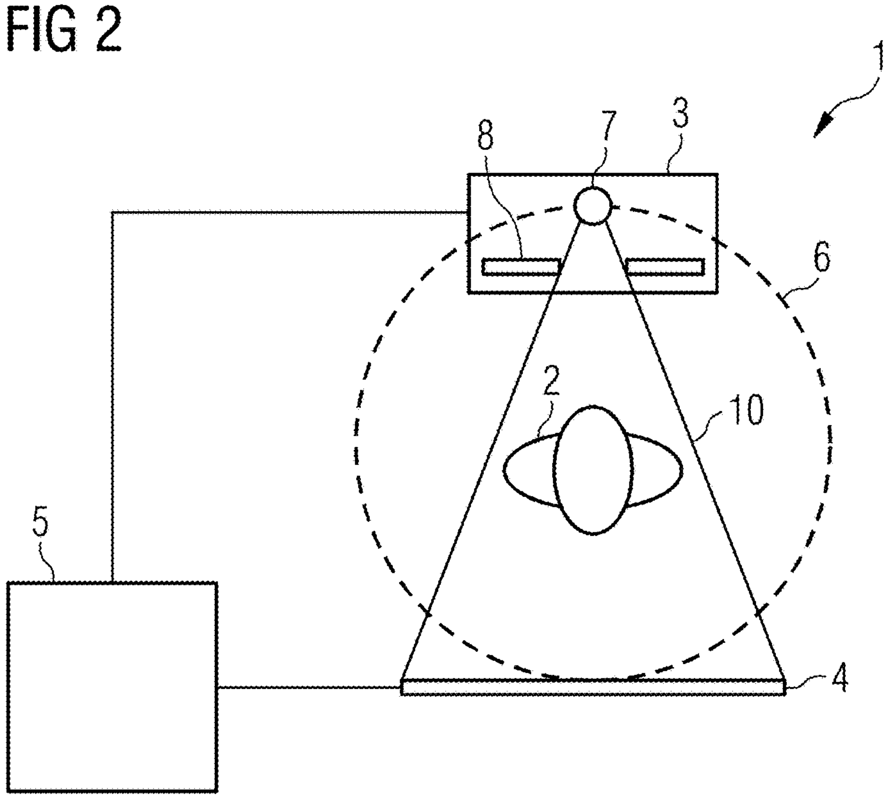
FIG. 2 shows a schematic representation of an X-ray system with kV switching according to an exemplary embodiment of the present invention.

In contrast to the CT system shown in FIG. 1, FIG. 2 shows a computed tomography system 1 in which the acceleration voltage of the X-ray radiation source 3 is varied temporally, for example by being regulated by the control device 5 to alternate in steps between two values of 80 kV and 140 kV with a frequency of, for example, 1000 Hz or 500 Hz; this is also referred to as "kV switching". In the case of a typical CT scan with 2000 projections per cycle, the tube voltage or acceleration voltage of the X-ray radiation source 3 is therefore switched every 2 to 4 projections.

The acceleration voltage therefore alternates quickly compared to the rotational movement of the X-ray detector 4 and the X-ray radiation source 3, which takes place on the circular path at a frequency of typically no more than approx. 4 Hz. The alternating acceleration voltage generates different X-ray spectra in the X-ray tube 7, in particular low-energy and high-energy X-ray spectra. These penetrate the patient 2 as X-rays 10 at the exit angle defined by the aperture 8. They also hit the energy-resolving X-ray detector 4. This energy-resolving X-ray detector therefore records measured values from X-ray projections of the patient that are generated using different X-ray spectra. Projection measurement data is thus acquired from different angular positions relative to the patient 2, which can be assigned temporally to the spectrum emitted by the X-ray tube 7 of the X-ray radiation source 3.

The recorded projection measurement data is then divided into its high-energy and low-energy projections for reconstruction and a separate reconstruction is carried out. The spectral separation of the projection measurement data is improved by the fact that the threshold values of the detection thresholds of the X-ray detector 4 are changed in synchronization with the change in the energy spectrum of the X-ray radiation source 3. The threshold values of the detection thresholds of the X-ray detector 4 therefore jump back and forth temporally between two settings. If the data transmission rate is to be reduced, only projection measurement data from a single detection threshold can be transmitted, wherein in phases of high voltage (for example 140 kV) a higher threshold with, for example, 55 keV is read out and in phases of low voltage (for example 80 kV) an energetically lower threshold with 20 keV is read out and transmitted to an evaluation unit or the control device 5.

Figure 3:
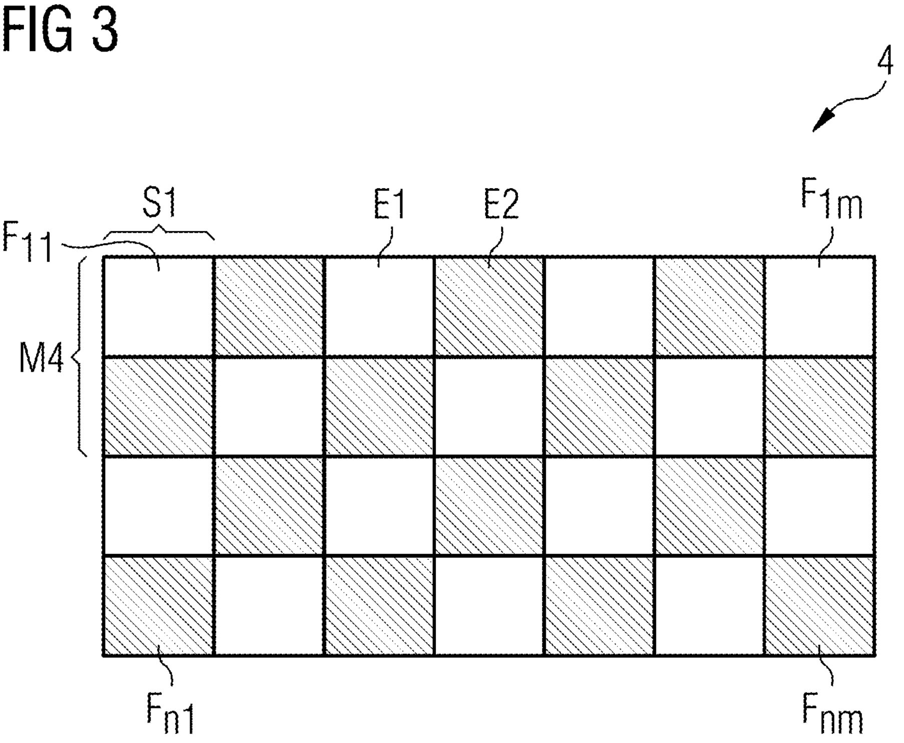
FIG. 3 shows a schematic representation of an X-ray detector of an X-ray system with spectral X-ray detection and ultra-high resolution.

FIG. 3 shows a schematic representation of an X-ray detector 4 of an X-ray system with spectral X-ray detection and ultra-high resolution. In the case of this variant, much smaller areas are used for the individual X-ray detector pixels or detector fields F11, . . . , Fnm of the X-ray detector 4 than is the case with conventional X-ray detectors. In the so-called S1 layout, the greater number of X-ray detector pixels per area, for example 2752 channels (channels correspond to columns) and 288 rows, allows an increased resolution to be achieved. However, for the reasons already mentioned, the data transmission is not designed for a correspondingly high data rate, so that the resolution is reduced, especially when moving images are recorded, by combining a total of four pixels from two neighboring rows. For example, in the so-called M4 layout, projection measurement data from only 1376 channels with only 144 rows is transmitted.

In the so-called UHR mode, the number of rows is reduced to 120 rows and, in the case of a scan of a moving heart, conventional projection measurement data from only one threshold of 20 keV is transmitted because the data transmission rate is limited by the hardware.

In order to enable the acquisition of spectrally resolved projection measurement data, two different detection thresholds E1, E2 with different threshold values are now defined depending on the position, as shown in FIG. 3, and the threshold values alternate in a checkerboard pattern across the channels (columns) and rows. For example, the detector fields left white in FIG. 3 are operated with a first detection threshold E1 with an energy of 20 keV and the hatched detector fields are operated with a detection threshold E2 with an energy of 50 keV. Spectrally separated images are then reconstructed separately on the basis of the projection measurement data of the detector fields of different field types or detector fields (white, hatched) with different detection thresholds E1, E2. Although the necessary interpolation of the gaps between the detector fields reduces the maximum possible sharpness and resolution of the images, the sampling however is uniform throughout the entire acquisition of the projection measurement data without a significant spatial and temporal offset and the resulting potential artifacts.

In order to generate high-resolution images, the assignment of the detection thresholds E1, E2 can be swapped between the fields of different field types (white, hatched) in successive projections or frames of one and the same measurement. In this case, the images are reconstructed as mixed images with full or maximum resolution without taking the detection thresholds E1, E2 into account.

Figure 4:
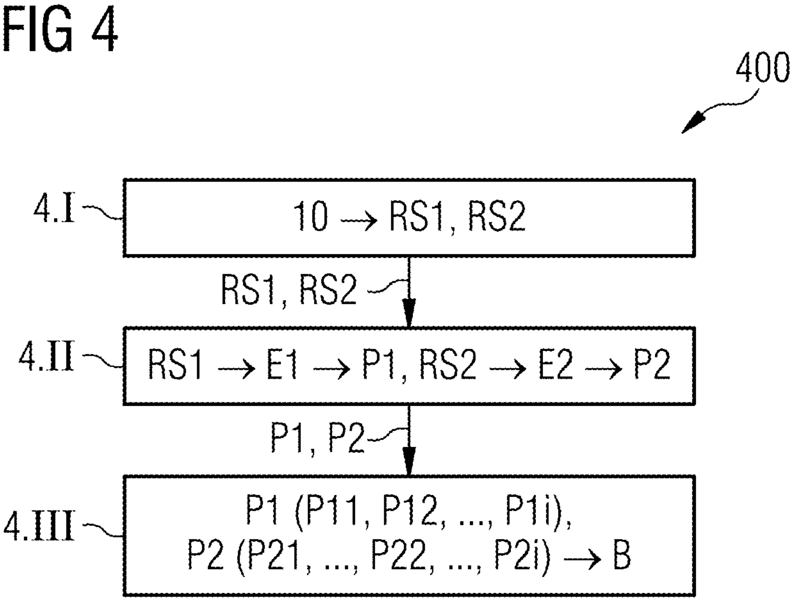
FIG. 4 shows a flow diagram illustrating the method according to an exemplary embodiment of the present invention for image reconstruction via an X-ray system according to an exemplary embodiment of the present invention.

FIG. 4 shows by way of an example a sequence of a method for image reconstruction according to an embodiment of the present invention as a flow diagram 400. In a first step 4. I of the method, X-rays RS1 with a first defined spectrum and X-rays RS2 with a second defined spectrum differing from the first defined spectrum are generated in a computed tomography system 1 preferably according to an embodiment of the present invention, as already described above. This means that the radiation RS1 has an energy distribution that differs from the radiation RS2.

This radiation RS1, RS2 penetrates at least partially through an examination object 2 and is detected as a projection of this examination object 2 by an X-ray detector 4 with temporal and/or spatial variation of the threshold values of the detection thresholds E1, E2 in the second step 4.II. The detection of the radiation RS1 with a first defined spectrum is carried out spatially and/or temporally separated from the detection of the radiation RS2 with a second defined spectrum. In contrast to previously used systems with spectral acquisition of X-rays, the detection thresholds E1, E2 of the X-ray detector 4 are adapted in temporal and/or spatial coordination to the respective X-ray spectrum of the radiation RS1, RS2 within one and the same scan. By adapting the detection thresholds E1, E2 to the respective X-ray spectrum of the radiation RS1, RS2, either an improved quality of the spectral images can be achieved or, by using a smaller number of adapted detection thresholds, the amount of data that is transmitted from the rotating X-ray detector 4 to the control device 5 via a slip ring can be reduced. Although the transmission of the projection measurement data P1, P2 from the co-moving X-ray detector 4 to the stationary control device 5 is time-critical and limited due to the properties of the slip ring, a spectrally resolved image of an examination object can be generated by reducing the number of thresholds despite the limitation of the data rate.

Accordingly, the projection measurement data P1 of the X-rays S1 are assigned to the first defined spectrum. The same method is used for the projection measurement data P2, which is assigned to the second defined spectrum.

During acquisition, the projection measurement data P1 and P2 may possibly be segmented further, namely into energy-resolved projection measurement data P11, P12, . . . , P1i, P21, P22, . . . , P2i, based on the energy distribution of the projection P1, P2. The projection measurement data P11, P12, . . . , P1i is assigned in this case to the first spectrum and the projection measurement data P21, P22, . . . , P2i is assigned to the second spectrum. The index i indicates the number of detection thresholds that are used to detect the X-rays with the respective different spectrum.

The projection measurement data P11 is also the data of the first spectrum from a defined energy range of the X-rays projected by the examination object 2, namely the energy range that is detected in a first bin of the energy-selective X-ray detector 4. The same applies analogously to the projection measurement data P2i, which is recorded in the ith bin and is assigned to the second spectrum. The bins of the X-ray detector 4 therefore each record data from a defined energy range of the projection. The limits of the energy ranges of the bins can be defined, for example by a control protocol or by an operator, and set with the aid of the control device 5. In particular, the limits of the energy ranges for acquiring projection measurement data of different spectra are adapted to the course of these spectra. As already described in detail, this process can include a temporal change of the energy ranges or a spatial variation of the energy ranges. Further steps of the acquisition are analogous to the methods already established in computed tomography.

The projection measurement data P1, P2 therefore contains information about the generating spectrum and about the energy distribution present in the projection. From this spectrally separated projection measurement data P1, P2, images can be generated in the third step 4. III for the individual energy ranges using known reconstruction algorithms. Depending on the requirements, these can then be mixed with each other in order to display certain materials or fabrics as highlighted as desired and to optimize them in terms of contrast and/or noise and/or contrast-to-noise ratio. Finally, the method according to an embodiment of the present invention provides an improved representation of the reconstructed image B due to the improved spectral separation.

Finally, it should be pointed out once again that the devices and methods described in detail above are merely exemplary embodiments which can be modified by the person skilled in the art in a wide variety of ways without departing from the scope of the present invention.

Furthermore, the use of the indefinite articles "a" or "an" does not exclude the possibility that the features in question may be present more than once. Similarly, the term "element" does not exclude the possibility that the component in question comprises multiple interacting subcomponents, which may also be spatially distributed.

Irrespective of the grammatical gender of a particular term, persons with male, female or other gender identities are included.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. An X-ray system for acquiring projection measurement data of an examination object, the X-ray system comprising:

an X-ray emitter arrangement having an X-ray radiation source configured to emit X-rays and switch between different acceleration voltages under control of a control device during a same measurement; and a photon-counting X-ray detector with at least one temporally variable detection threshold for spectrally resolved detection of the X-rays, the photon-counting x-ray detector configured to detect the X-rays in synchronization with activation of the X-ray radiation source, wherein the synchronization includes an adjustment of the at least one temporally variable detection threshold to a value of the different acceleration voltages.

2. The X-ray system as claimed in claim 1, wherein the X-ray radiation source is configured to emit X-rays that are variable at least one of spatially or temporally spectrally in the same measurement.

3. The X-ray system as claimed in claim 2, wherein at least one of the at least one detection threshold is adaptable to the X-rays and variable at least one of spatially or temporally in the same measurement, and the X-rays are variable at least one of spatially or temporally spectrally in the same measurement.

4. The X-ray system as claimed in claim 3, wherein the X-ray radiation source has a pre-filter configured to divide the X-rays into at least two spatially separated X-ray beam sections with a different X-ray spectrum.

5. The X-ray system as claimed in claim 2, wherein the X-ray radiation source has a pre-filter configured to divide the X-rays into at least two spatially separated X-ray beam sections with a different X-ray spectrum.

6. The X-ray system as claimed in claim 1, wherein the X-ray radiation source has a pre-filter configured to divide the X-rays into at least two spatially separated X-ray beam sections with a different X-ray spectrum.

7. The X-ray system as claimed in claim 6, wherein the pre-filter is configured to distribute different regions of an X-ray spectrum of the X-rays to spatially defined angular regions of the photon-counting X-ray detector, and detection thresholds of the photon-counting X-ray detector have different values depending on the different regions of the X-ray spectrum in different angular regions.

8. The X-ray system as claimed in claim 7, wherein the pre-filter includes a first filter section with a first filter material and a second filter section with a second filter material, the second filter material being different from the first filter material.

9. The X-ray system as claimed in claim 6, wherein the pre-filter includes a first filter section with a first filter material and a second filter section with a second filter material, the second filter material being different from the first filter material.

10. The X-ray system as claimed in claim 9, wherein the first filter material has gold and the second filter material has tin.

11. The X-ray system as claimed in claim 1, wherein the photon-counting X-ray detector is configured to read out and transmit only a portion of the at least one temporally variable detection threshold at a time, in synchronization with the switching of the X-ray radiation source and controlled by the control device.

12. The X-ray system as claimed in claim 1, wherein the photon-counting X-ray detector has at least one first sub-area with a first detection threshold and at least one second sub-area with a second detection threshold, which differs from the first detection threshold, wherein the at least one second sub-area is arranged spatially alternating with the at least one first sub-area.

13. The X-ray system as claimed in claim 12, wherein the first sub-area and the second sub-area form a checkerboard pattern.

14. The X-ray system as claimed in claim 12, wherein the photon-counting X-ray detector is configured to exchange the first detection threshold of the at least one first sub-area and the second detection threshold of the at least one second sub-area at set time intervals.

15. A method for image reconstruction via an X-ray system as claimed in claim 1, the method comprising:

generating and emitting the X-rays;

detecting, via energy-resolved detection by the photon-counting X-ray detector, at least the X-rays passing through the examination object as projection measurement data; and reconstructing an image based on the projection measurement data.

16. A non-transitory computer program product having a computer program, which is loadable directly into a memory device of a control device of an X-ray system, the computer program having program sections for carrying out the method as claimed in claim 15 when the computer program is executed at the control device of the X-ray system.

17. A non-transitory computer-readable medium storing program sections that, when executed by a computing unit, cause the computing unit to carry out the method as claimed in claim 15.

18. A method for image reconstruction via an X-ray system, the method comprising:

emitting X-rays via an X-ray radiation source;

switching, by the X-ray radiation source, between different acceleration voltages under control of a control device during a same measurement;

detecting, via energy-resolved detection by a photon-counting X-ray detector, at least X-rays passing through an examination object as projection measurement data, wherein the photon-counting X-ray detector has a detection threshold for spectrally resolved detection of the X-rays, the detection threshold being temporally variable, and the photon-counting X-ray detector is configured to detect the X-rays in synchronization with activation of the X-ray radiation source, wherein the synchronization includes an adjustment of the detection threshold to a value of the different acceleration voltages; and reconstructing an image based on the projection measurement data.

* * * * *